United States Patent [19]

Tylko

[11] 3,932,171
[45] Jan. 13, 1976

[54] PROCESS FOR HIGH TEMPERATURE TREATMENT OF MATERIALS

[75] Inventor: Jozef Kazimierz Tylko, Faringdon, England

[73] Assignee: Tetronics Research and Development Company, Faringdon, England

[22] Filed: Apr. 19, 1974

[21] Appl. No.: 462,403

Related U.S. Application Data

[60] Continuation of Ser. No. 399,972, Sept. 24, 1973, abandoned, which is a division of Ser. No. 225,892, Feb. 14, 1972, Pat. No. 3,783,167.

[52] U.S. Cl............................ 75/10 R; 13/1; 75/11; 75/65 EB; 75/72; 219/129 P
[51] Int. Cl.² .................... C22B 4/00; B23K 1/10
[58] Field of Search .................... 75/10, 65; 13/1; 219/129 P

[56] References Cited
UNITED STATES PATENTS

| 2,994,801 | 8/1961 | Hanks | 75/65 EB |
| 3,005,859 | 10/1961 | Candidus | 75/65 EB |
| 3,394,242 | 7/1968 | King | 219/121 P |
| 3,429,691 | 2/1969 | McLaughlin | 75/10 |
| 3,436,465 | 4/1969 | De Ruiter | 13/1 |
| 3,449,505 | 6/1969 | Brzozowski | 13/1 |

*Primary Examiner*—Peter D. Rosenberg
*Attorney, Agent, or Firm*—Dennison, Dennison, Townshend & Meserole

[57] ABSTRACT

A continuous electrical discharge arc column is moved bodily through a closed arcuate path. Particulate material is fed into the moving column at an angle such that the particles of the material travel through the column in substantially spiral paths. After emerging from the column, the arc treated particles are collected at a point of deposit spaced vertically below the column. During its movement, which is at a controlled rate, the arc column is expanded.

31 Claims, No Drawings tion of the treated material may be effected; for example, oxidizing, reducing or neutral atmospheres may be introduced into the treatment zone or zones, chemical reactants may be introduced in the plasma stream or elsewhere, and rapidly expanding cold gases which are non-reactive with injected substances may be introduced for rapid quenching of reaction products; gases may be withdrawn from atmospheres resulting from action of the arc on the material being treated; various powders and fluids may be introduced into the plasma stream.

I claim:

1. A process for high temperature treatment of particulate material, which comprises the steps of:
establishing a continuous electrical discharge arc column; moving the column continuously in a closed arcuate path in such a manner as to expand said arc in the course of its movement; passing particulate material into and through the moving column so that the particles of the material travel in substantially spiral paths while passing through the column; and collecting the arc treated material at a point of deposit spaced from the column.

2. In the process of claim 1, the expanded arc column being a plasma stream.

3. In the process of claim 2, the additional step of moving the arc column into selective positions of inclination from the vertical to alter its length.

4. In the process of claim 3, the arcuate path of the plasma stream having the geometrical configuration of a truncated cone.

5. In the process of claim 3, the arcuate path of the plasma stream having the geometrical configuration of a cylinder.

6. In the process of claim 2, the additional step of entraining in the plasma stream arc chemical substances reactant with the material passing through the stream to provide selective treatment other than the heat treatment of the arc.

7. In the process of claim 2, the additional step of creating in the immediate vicinity of the treatment zone of the plasma stream atmospheres of selective constituency to provide treatment other than the heat treatment of the arc.

8. A process for high temperature treatment of particulate material, which comprises the steps of: establishing and maintaining an electrical discharge arc between a stationary electrode in the form of a circle and a movable electrode rotatable on the vertical axis of the circular electrode through a path comprising a circle of a diameter different from the diameter of the circular electrode; moving the movable electrode axially along its axis into a position elevated with respect to the circular electrode; rotating the movable electrode on its axis to expand the arc and carry it through a path having the geometrical configuration of a truncated cone; passing particulate material downwardly through the moving expanded arc; and collecting the arc treated material at a point of deposit below the circular electrode.

9. In the process of claim 8, the electrical discharge arc being in the form of a plasma stream.

10. A method of treating particulate material which comprises moving at least one source of plasma around a closed circular substantially horizontal path and directing a stream of plasma from said source downwardly towards ring-shaped horizontal stationary electrode means of a diameter greater than said circular path, said plasma source being moved around its path at a speed sufficient to develop a plasma-filled zone in at least a major part of the space lying between the path of said source and said ring-shaped stationary electrode means and feeding said particulate material into the upper part of said space in the form of a substantially uniform cylindrical curtain.

11. A method of producing metals which comprises supplying a metal-bearing material in particulate form into an enclosed zone and feeding a substantially cylindrical curtain of said metal-bearing material into the upper part of a plasma zone within said enclosed zone, said plasma zone being developed by directing a stream of plasma downwardly from at least one source of plasma, moving in an endless horizontal path, towards ring-shaped horizontal stationary electrode means of greater dimension than said endless path, said plasma source being moved around said path at a speed sufficient to maintain the space between said path and said annular electrode means substantially filled with plasma, converting said metal-bearing material in highly heated condition to the metallic state and recovering metal from the lower part of said enclosed zone below said ring-shaped stationary electrode means.

12. A method according to claim 11 in which a carbon-bearing liquid or solid material is fed into said plasma zone for reaction with said metal-bearing material.

13. A method according to claim 11 in which the metal-bearing material in highly heated condition is contacted with hydrogen for reduction of said metal-bearing material.

14. A method according to claim 11 in which the metal-bearing material in highly heated condition is contacted with gaseous hydrocarbon for reduction of said metal-bearing material.

15. A process for the production of aluminum which comprises supplying a finely divided particulate alumina-containing material into an enclosed zone and feeding said particulate alumina-containing material into the upper part of a plasma zone within said enclosed zone, said plasma zone being developed by directing a stream of plasma downwardly from at least one source of plasma, moving in a closed circular horizontal path, towards ring-shaped horizontal stationary electrode means of greater diameter than said plasma source path, said plasma source being moved around said path at a speed sufficient to maintain the space between said path and said annular electrode means substantially filled with plasma, introducing a carbon-bearing material into said enclosed zone for reaction with said alumina and recovering aluminum from the lower part of said enclosed zone below said ring-shaped electrode means.

16. A process for the production of titania from a titaniferous ore containing iron compounds which comprises supplying said ore in particulate form into an enclosed zone and feeding said ore into the upper part of a plasma zone within said enclosed zone, said plasma zone being developed by directing a stream of plasma downwardly from at least one source of plasma, moving in a closed circular horizontal path, towards ring-shaped horizontal stationary electrode means of greater diameter than said plasma source path, said plasma source being moved around said path at a speed sufficient to maintain the space between said path and said annular electrode means substantially filled with plasma, maintaining a reducing atmosphere in said

PROCESS FOR HIGH TEMPERATURE TREATMENT OF MATERIALS

CROSS REFERENCE

This is a continuation of application Ser. No. 399,972 filed Sept. 24, 1973, abandoned, which application in-turn is a division of my copending allowed application Ser. No. 225,892 filed Feb. 14, 1972, titled HIGH TEMPERATURE TREATMENT OF MATERIALS, now U.S. Pat. No. 3,783,167.

BACKGROUND

The field of the present invention is the art of pyrometallurgy, particularly processes for high temperature treatment of particulate material by subjection to the action of an electrical discharge arc.

The prior art concerned with such processes teaches that in order to achieve a complete and controlled changed in materials subjected to the action of electrical discharges, all such materials must pass through the zone of discharge and their time of residence in this zone must be of a certain controlled duration. In an effort to accomplish such control, use has been made of an arc spread into a fan-like shape, known as an expanded arc. Methods of obtaining and expanding an arc column were known before the Second World War and described by W. Weizel and R. Rompe in "Theorie Elektrischer Lichtbogen und Funken" (Leipzig, Barth, 1949), however such methods, although of scientific interest, do not lend themselves to industrial exploitation. The inevitably high thermal losses in the rotating cylinder and inability to inject sufficiently large quantities of feedstocks without affecting the stability of the discharge proved the main obstacles preventing industrial utilization of such devices.

SUMMARY OF THE INVENTION

A preferred apparatus by which the process of the present invention is carried out is the plasma arc furnace disclosed in my copending allowed application Ser. No. 225,892 filed Feb. 14, 1972. The illustration and description of the apparatus, its operation and functions as given in that application are incorporated herein by reference as matter essential to an understanding of the process comprising the present invention.

The invention which is the subject of this application is a process for high temperature treatment of particulate material in an expanded electrical arc column moving in a closed arcuate path. The particles of the material may be of any individual size and shape compatible with conditions imposed by structure of apparatus by which the process is practiced. The term "treatment" as used herein includes calcinating, roasting, smelting, melting and refining of metals in general, comminuting, spheroidizing, coating, chemical reactions including the reduction and separation of ores, compounds of nonmetallic elements, formation of compounds of the hard metals, and any use to which the apparatus of my aforesaid application may be put.

The process comprising the present invention is carried out by the steps of: establishing an electrical discharge arc column having upper and lower terminals, moving the column through a closed arcuate path, expanding the column during the course of its travel along the path, passing particulate material through the expanded column at an angle such that the particles comprising the material pass into and through the column in spiral paths which substantially prolong the period of their residence in the column, and collecting the arc treated particles emerging from the column at a point of deposit spaced below the lower terminal of the arc. The longitudinal axis of the arc column may be either vertical or inclined from the vertical. The locus of either arc terminal may optionally be at a movable electrode or a fixed electrode. If one is at a fixed electrode, the other must be at a movable electrode, and vice versa. In either case, the terminal of the arc at the movable electrode is moved by and with that electrode, and the terminal of the arc at the fixed electrode moves on and along the fixed electrode sliding longitudinally thereon.

Various reactant substances may be entrained in the arc column to effect selective chemical treatment of particles in addition to the heat treatment of the arc. Other treatment substances and atmospheres may be introduced at various stages of the process as additional steps.

DETAILED DESCRIPTION

In its simplest form, the process of the present invention is carried out by establishing a continuous electrical discharge arc column, moving the column bodily through a closed arcuate path, passing particulate material into and through the moving column at an angle thereto such that the particles of the material in passing through the column travel in spiral paths between their points of entry into the column and their points of exit therefrom, and collecting the arc treated particles at a point of deposit after they emerge from the moving column.

In the preferred mode of practicing the invention, the arc column is initiated and maintained as a plasma stream arc inclined with respect to the vertical. It discharges between an upper electrode moving in a closed circle path and a stationary lower electrode which provides a concentric closed circle path along which the lower terminal of the arc moves in correspondence with movement of the upper electrode. After the arc is struck, it is expanded to a fan-like shape by moving the upper electrode through its circle path and also by moving it upwardly to increase the vertical spacing from the stationary electrode. As a result of the combined movements of the upper electrode, the plasma stream arc revolves in its entirety through a path which has the geometric configuration of a frustrum of a cone, so that the expanded arc becomes, in effect, an inclined, continuously revolving, sector-shaped curtain.

During revolution of the plasma stream arc, particulate material to be treated is fed downwardly into the upper end of the stream in which it is entrained and carried by and with the arc until it has passed entirely therethrough. Due to the revolving movement of the arc, and its inclination, each particle of the material travels down the arc in a spiral path which substantially prolongs its period of residence in the plasma stream. This prolongation is a salient feature of the process. After emerging from the under face of the plasma stream, the treated material is deposited in a refractory crucible in which it may be subjected to further treatment.

The process optionally includes other steps by which, in combination with the electrical arc discharge, various other treatments affecting the nature and composienclosed zone, collecting the reaction products at the bottom of said enclosed zone and allowing them to separate into an iron-rich bottom layer and a titania-rich upper layer, removing the titania-rich upper layer and treating it with oxygen.

17. A process for treating particulate material to effect a physical and/or chemical change thereof which comprises moving at least one source of plasma around a closed circular path within an enclosed zone and directing a stream of plasma from said source downwardly towards a stationary electrode, said plasma source being moved around its path at a speed sufficient to maintain an expanded arc column in at least a major part of the space lying between the path of said source and said stationary electrode and feeding said particulate material into the upper part of said space.

18. A process according to claim 17 for the production of zirconia which comprises supplying a zirconium silicate-containing material in particulate form into said enclosed zone, feeding said ore into the upper part of said expanded arc column maintained within said enclosed zone, whereby to effect the thermal decomposition of zirconium silicate to zirconia and silica, collecting the reaction product and separating zirconia from silica present in such reaction product.

19. A process according to claim 18 further including the introduction of a sodium compound into the enclosed zone for reaction with the silica.

20. A process according to claim 17 for the production of copper which comprises supplying a copper-sulphide ore in particulate form into said enclosed zone, feeding said ore into the upper part of said expanded arc column maintained within said enclosed zone, introducing a reductant into said enclosed zone and withdrawing copper from said enclosed zone.

21. A method according to claim 20 further including withdrawing sulphur-rich gases from an upper portion of said enclosed zone and introduction of reductant into the enclosed zone in the vicinity of or below said stationary electrode.

22. A method of melting metals, such as copper cathodes, which comprises moving at least one source of plasma around a closed circular path within an enclosed zone and directing a stream of plasma downwardly towards a stationary electrode, said plasma source being moved around its path at a speed sufficient to maintain an expanded arc column in at least a major part of the space lying between the path of said source and said stationary electrode and feeding said metal into or into close proximity with the plasma in said space.

23. A method according to claim 22 in which the said stationary electrode is constituted by rods or bars of said metal which are progressively fed toward said space.

24. A process according to claim 17 in which said particulate material is introduced in the form of a substantially uniform cylindrical curtain.

25. A process according to claim 17 in which said stationary electrode is constituted by a ring-shaped electrode of greater diameter than said path and mounted about the bottom of said enclosed zone.

26. A process according to claim 10 in which products of the process collecting in the bottom of said enclosed zone are connected in the main electric circuit of the expanded arc column.

27. A process according to claim 10 in which the counter electrode is constituted by electrically conductive deposits in the bottom of said enclosed zone, which is formed of an electrically conductive material.

28. A process according to claim 10 in which the particulate material is subject to treatment in the expanded arc column extending between said plasma source and said ring-shaped electrode and in a tail flame region below said ring-shaped electrode.

29. A process according to claim 17 in which said particulate material is a metal-bearing material and said process includes converting said metal-bearing material to the metallic state and recovering metal from the bottom of the enclosed zone.

30. A process according to claim 17 in which, in addition to the particulate material for treatment, a reductant is introduced into said enclosed zone for reaction with said particulate material.

31. A process according to claim 28 in which a hydrocarbon, circulated through the counter electrode, is injected into the tail flame region.

* * * * *

UNITED STATES PATENT OFFICE
CERTIFICATE OF CORRECTION

PATENT NO. : 3,932,171
DATED : January 13, 1976
INVENTOR(S) : Jozef Kazimierz Tylko It is certified that error appears in the above—identified patent and that said Letters Patent are hereby corrected as shown below:

The name of the assignee should be corrected to read:

TETRONICS RESEARCH AND DEVELOPMENT COMPANY LIMITED

Signed and Sealed this twenty-seventh Day of April 1976

[SEAL]

Attest:

RUTH C. MASON
*Attesting Officer*

C. MARSHALL DANN
*Commissioner of Patents and Trademarks*